United States Patent
Zhang et al.

(10) Patent No.: US 8,077,738 B2
(45) Date of Patent: *Dec. 13, 2011

(54) DEFAULT INTERNET TRAFFIC AND TRANSPARENT PASSTHROUGH

(75) Inventors: Shujin Zhang, San Mateo, CA (US); Jie Chu, Los Altos, CA (US); Maria Alice Dos Santos, Redwood City, CA (US)

(73) Assignee: Cisco Technology, Inc., San Jose, CA (US)

(*) Notice: Subject to any disclaimer, the term of this patent is extended or adjusted under 35 U.S.C. 154(b) by 271 days.

This patent is subject to a terminal disclaimer.

(21) Appl. No.: 12/144,551

(22) Filed: Jun. 23, 2008

(65) Prior Publication Data

US 2008/0256620 A1    Oct. 16, 2008

Related U.S. Application Data

(63) Continuation of application No. 10/117,803, filed on Apr. 4, 2002, now Pat. No. 7,420,932, which is a continuation of application No. 09/223,243, filed on Dec. 30, 1998, now Pat. No. 6,490,290.

(51) Int. Cl.
*H04J 3/16* (2006.01)
*H04J 3/22* (2006.01)

(52) U.S. Cl. ........................................ 370/466

(58) Field of Classification Search ............. 370/254, 370/401, 338, 351, 390, 392, 389, 352, 400, 370/395, 248, 252, 382; 709/229, 223, 213, 709/214, 217, 238, 222; 379/121; 455/433, 455/435, 422, 432, 436, 522; 713/1; 705/1

See application file for complete search history.

(56) References Cited

U.S. PATENT DOCUMENTS

| | | | |
|---|---|---|---|
| 4,922,486 A | 5/1990 | Lidinsky et al. |
| 5,136,580 A | 8/1992 | Videlock et al. |
| 5,241,594 A | 8/1993 | Kung |
| 5,274,631 A | 12/1993 | Bhardwaj |
| 5,280,480 A | 1/1994 | Pitt et al. |

(Continued)

FOREIGN PATENT DOCUMENTS

WO    WO 99/53408    10/1999

OTHER PUBLICATIONS

Active Software, Inc. "Active Software's Integration System", Jul. 24, 1998, 26 pages.

(Continued)

*Primary Examiner* — Hassan Phillips
*Assistant Examiner* — Prenell P Jones
(74) *Attorney, Agent, or Firm* — Patent Capital Group

(57) ABSTRACT

A method for routing packets sent from a user to the internet is provided for systems in which the user is connected to a private network. The method includes: extracting a source network address from the packet; using said source network address to retrieve a user profile for the user; examining said user profile to determine whether to route the packet through the private network or to route the packet directly to the Internet; and routing said packet according to said profile. This allows a user or network provider to choose whether to route packets destined for the Internet directly to the Internet rather than through the private network, thus preventing excessive network traffic on the private network.

15 Claims, 4 Drawing Sheets

U.S. PATENT DOCUMENTS

| | | | | |
|---|---|---|---|---|
| 5,423,002 A | | 6/1995 | Hart | |
| 5,430,715 A | | 7/1995 | Corbalis et al. | |
| 5,555,244 A | | 9/1996 | Gupta et al. | |
| 5,570,361 A | | 10/1996 | Norizuki et al. | |
| 5,583,862 A | | 12/1996 | Callon | |
| 5,592,470 A | | 1/1997 | Rudrapatna et al. | |
| 5,594,732 A | | 1/1997 | Bell et al. | |
| 5,610,910 A | * | 3/1997 | Focsaneanu et al. | 370/351 |
| 5,617,417 A | | 4/1997 | Sathe et al. | |
| 5,655,077 A | | 8/1997 | Jones et al. | |
| 5,659,542 A | | 8/1997 | Bell et al. | |
| 5,671,354 A | | 9/1997 | Ito et al. | |
| 5,673,265 A | | 9/1997 | Gupta et al. | |
| 5,684,950 A | | 11/1997 | Dare et al. | |
| 5,699,521 A | | 12/1997 | Iizuka et al. | |
| 5,737,526 A | | 4/1998 | Periasamy et al. | |
| 5,740,171 A | | 4/1998 | Mazzola et al. | |
| 5,740,176 A | | 4/1998 | Gupta et al. | |
| 5,787,253 A | | 7/1998 | McCreery et al. | |
| 5,793,763 A | | 8/1998 | Mayes et al. | |
| 5,796,952 A | * | 8/1998 | Davis et al. | 709/224 |
| 5,799,017 A | | 8/1998 | Gupta et al. | |
| 5,802,047 A | | 9/1998 | Kinoshita | |
| 5,802,316 A | | 9/1998 | Ito et al. | |
| 5,805,595 A | | 9/1998 | Sharper et al. | |
| 5,815,665 A | | 9/1998 | Teper et al. | |
| 5,835,727 A | | 11/1998 | Wong et al. | |
| 5,838,683 A | | 11/1998 | Corley et al. | |
| 5,854,901 A | | 12/1998 | Cole et al. | |
| 5,867,495 A | | 2/1999 | Elliott et al. | |
| 5,883,893 A | | 3/1999 | Rumer et al. | |
| 5,933,625 A | | 8/1999 | Sugiyama | |
| 5,944,824 A | | 8/1999 | He | |
| 5,959,990 A | | 9/1999 | Frantz et al. | |
| 5,991,810 A | * | 11/1999 | Shapiro et al. | 709/229 |
| 5,991,828 A | | 11/1999 | Horie et al. | |
| 6,006,272 A | * | 12/1999 | Aravamudan et al. | 709/245 |
| 6,009,103 A | | 12/1999 | Woundy | |
| 6,011,909 A | | 1/2000 | Newlin et al. | |
| 6,011,910 A | | 1/2000 | Chau et al. | |
| 6,018,770 A | | 1/2000 | Little et al. | |
| 6,021,496 A | | 2/2000 | Dutcher et al. | |
| 6,026,086 A | | 2/2000 | Lancelot et al. | |
| 6,026,441 A | | 2/2000 | Ronen | |
| 6,028,848 A | | 2/2000 | Bhatia et al. | |
| 6,029,203 A | | 2/2000 | Bhatia et al. | |
| 6,044,465 A | | 3/2000 | Dutcher et al. | |
| 6,047,325 A | | 4/2000 | Jain et al. | |
| 6,047,376 A | | 4/2000 | Hoscoe | |
| 6,055,236 A | | 4/2000 | Nessett et al. | |
| 6,065,049 A | | 5/2000 | Beser et al. | |
| 6,065,064 A | | 5/2000 | Satoh et al. | |
| 6,091,951 A | | 7/2000 | Sturniolo et al. | |
| 6,092,196 A | | 7/2000 | Reiche | |
| 6,098,106 A | | 8/2000 | Philyaw et al. | |
| 6,118,768 A | * | 9/2000 | Bhatia et al. | 370/254 |
| 6,119,160 A | | 9/2000 | Zhang et al. | |
| 6,141,687 A | | 10/2000 | Blair | |
| 6,157,636 A | | 12/2000 | Voit et al. | |
| 6,160,808 A | | 12/2000 | Maurya | |
| 6,181,935 B1 | * | 1/2001 | Gossman et al. | 455/433 |
| 6,199,113 B1 | * | 3/2001 | Alegre et al. | 709/229 |
| 6,226,678 B1 | | 5/2001 | Mattaway et al. | |
| 6,240,449 B1 | * | 5/2001 | Nadeau | 709/223 |
| 6,269,099 B1 | | 7/2001 | Borella et al. | |
| 6,317,594 B1 | | 11/2001 | Gossman et al. | |
| 6,430,276 B1 | * | 8/2002 | Bouvier et al. | 379/121.01 |
| 6,490,290 B1 | * | 12/2002 | Zhang et al. | 370/401 |
| 6,513,111 B2 | * | 1/2003 | Klimczak et al. | 713/1 |
| 6,578,079 B1 | * | 6/2003 | Gittins | 709/229 |
| 6,751,729 B1 | | 6/2004 | Giniger et al. | |
| 7,023,825 B1 | * | 4/2006 | Haumont et al. | 370/338 |
| 7,420,932 B1 | | 9/2008 | Zhang et al. | |
| 2001/0011222 A1 | * | 8/2001 | McLauchlin et al. | 705/1 |
| 2009/0103536 A1 | * | 4/2009 | Basso et al. | 370/392 |
| 2009/0109959 A1 | * | 4/2009 | Elliott et al. | 370/352 |

OTHER PUBLICATIONS

Ascend Communications, Inc., Access Control Product Information, 1997, 4 pages.

Ascend Communications, Inc., "Remote Access Network Security", Jul. 24, 1998, pp. 1-8.

Droms, R., "Dynamic Host Configuration Protocol", Buckwell University, Network Working Group, Oct. 1993, pp. 1-35.

NAT and Networks, Sep. 19, 1998, pp. 1-12.

Mecklermedia Corporation, "NAT-PC Webopaedia Definition and Links", Sep. 19, 1998, 1 page.

NAT Information, "Network Address Translation Information", Sep. 19, 1998, 2 pages.

Perkins, D., "Requirements for an Internet Standard Point-to-Point Protocol", Carnegie Mellon University, Network Working Group, Dec. 1993, 10 pages.

Simpson, W., The Point-to-Point Protocol (PPP), Daydreamer, Network Working Group, Dec. 1993, 46 pages.

Carrel, D., et al., The TACACS+ Protocol, Version 1.78, Cisco Systems, Inc., printed from ftp://ftp-eng.cisco.com/edweber/tax-rfc.1.78.txt on Oct. 23, 2000, 40 pages.

Valencia, et al., "Layer Two Tunneling Protocol 'L2TP'", PPP Working Group, May 1998, 66 pages.

"L2TP", Mecklermedia Corporation, printed from http://webopedia.internet.com/TERM/L/L2TP/html, Sep. 21, 1998, 1 page.

"Tunneling", Sep. 21, 1998, Mecklermedia Corporation, printed from http://webopedia.internet.com/TERM/t/tunneling.html, 1 page.

* cited by examiner

| USER ADDRESSES | FLAGS | OTHER DATA |
|---|---|---|
| | 204 | |
| | 204 | |
| | 204 | |
| | 204 | |
| | | |
| | | |
| | | |
| | | |
| | | |
| | | |
| | | |
| | | |

DEFAULT INTERNET TRAFFIC AND TRANSPARENT PASSTHROUGH

CROSS-REFERENCE TO RELATED APPLICATIONS

This application is a continuation of co-pending U.S. patent application Ser. No. 10/117,803, filed on Apr. 4, 2002, entitled "Default Internet Traffic and Transparent Passthrough" in the name of the same inventors and commonly owned herewith, which is a continuation of Ser. No. 09/223,243, filed Dec. 30, 1998, now U.S. Pat. No. 6,490,290.

BACKGROUND OF THE INVENTION

1. Field Of The Invention

The present invention relates to the field of computer networks. More particularly, the present invention relates to allowing communications between a user and the Internet without passing the communications through a private network.

2. The Background

In recent years, "intranets" have been rising in popularity, especially with large companies. An intranet is an internal network that serves only a specific type of person (such as employees of a corporation, or students at a school). The intranet is usually not accessible to the general public. Intranets have become popular mainly because they allow for much more productive communication between users within the network, even when the users are dispersed over a wide geographic area (such as in multi-national corporations).

FIG. 1 is a block diagram depicting one way to connect to an intranet. Personal computer 10 connects through a link 12, generally a Point-to-Point Protocol (PPP) link, to an Internet service provider (ISP) or access point (AP) 14. The ISP or AP 14 then connects through link 16 to the Intranet 18.

Many entities that maintain intranets, however, have also wanted to offer users access to the Internet as well. There were, however, a limited number of ways that this could be accomplished. The first, and most simple, way would be for the user to first terminate the existing connection between the PC 10 and the ISP or access point 14. Then the user could log into the Internet. The major drawbacks of this solution are obvious. It does not allow for simultaneous connection to an intranet and the Internet, thus limiting the productivity of the user. Additionally, it requires termination of the link between the PC and the ISP, thus using up valuable time on the user's end, as he has to re-initiate a connection process.

The second way an entity could offer access to the Internet is to have a preconfigured connection from the intranet to the Internet, such that communications between the user and the second intranet or Internet pass through the intranet. FIG. 2 is a block diagram illustrating a connection to the Internet 62 through an intranet 58. A user at PC 50 maintains a connection 52 to ISP 54, which is connected to the intranet 58. Intranet 58 is then connected through link 60 to the Internet 62. The drawback of this solution is that the traffic from the user at PC 50 to the Internet 62 passes through the intranet 58. This increases the traffic traveling through the intranet 58 and poses a security risk to the information sent via the intranet 58.

A Virtual Private Network (VPN) is a private network configured to communicate with its users over the Internet, utilizing a technique called tunneling as to ensure that the data cannot be read by unauthorized users. Tunneling involves encapsulating a packet of data around a frame or packet of a different protocol for transport. Security protocols such as the IP Security Protocol (IPSEC) may also be utilized in order to further reduce the chances of unauthorized access. Thus, the link between the ISP and the intranet in the examples described above (16 in FIG. 1 and 56 in FIG. 2) may be virtual private networks.

Even when using a VPN, the same problems arise in directing traffic to and from the Internet when the user is connected to an intranet.

What is needed is a method by which an entity may provide Internet access to its users without encountering the problems that arise in passing Internet traffic through the intranet.

SUMMARY OF THE INVENTION

A method for routing packets sent from a user to the internet is provided for systems in which the user is connected to a private network. The method includes: extracting a source network address from the packet; using said source network address to retrieve a user profile for the user; examining said user profile to determine whether to route the packet through the private network or to route the packet directly to the Internet; and routing said packet according to said profile. This allows a user or network provider to choose whether to route packets destined for the Internet directly to the Internet rather than through the private network, thus preventing excessive network traffic on the private network.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

In accordance with a presently preferred embodiment of the present invention, the components, process steps, and/or data structures are implemented using a gateway device. Different implementations may be used and may include other types of operating systems, computing platforms, computer programs, and/or general purpose machines. In addition, those of ordinary skill in the art will readily recognize that devices of a less general purpose nature, such as hardwired devices, devices relying on Field Programmable Gate Array (FPGA) or Application-Specific Integrated Circuit (ASIC) technology, or the like, may also be used without departing from the scope and spirit of the inventive concepts disclosed herewith.

A method for providing Internet access to users connected to a private network is provided. This method may be executed by a gateway. A gateway is a device which performs protocol conversion between different types of networks or applications. The term gateway is not meant to be limited to a single type of device, as any device, hardware or software, that may act as a bridge between the user and the networks may be considered a gateway for purposes of this application.

Figure 1:
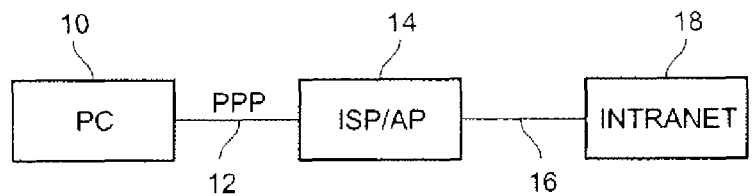
FIG. 1 is a block diagram depicting one way for a user to connect to an intranet.
Figure 2:
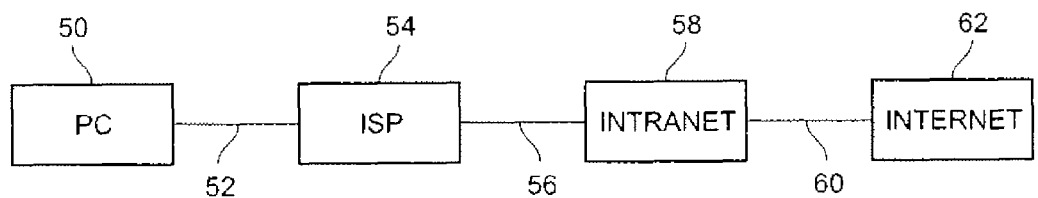
FIG. 2 is a block diagram illustrating a connection to the Internet through an intranet.
Figure 3:
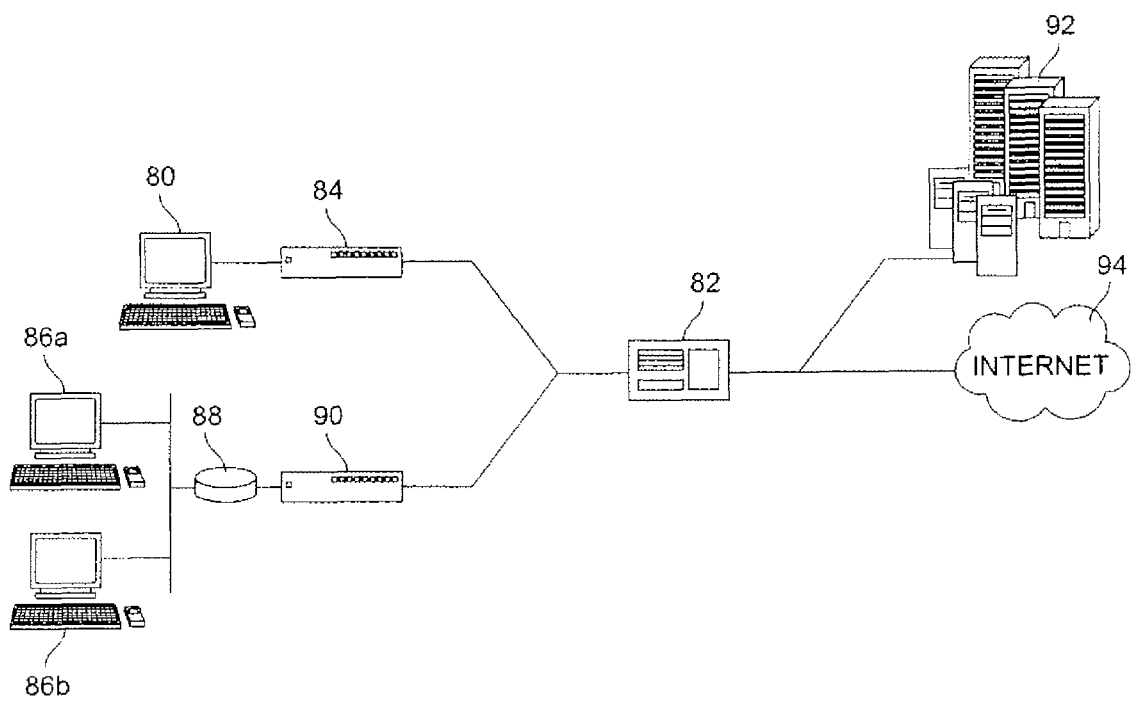
FIG. 3 is a diagram illustrating the use of a gateway to couple users with a private network and the Internet in accordance with a presently preferred embodiment of the present invention.

FIG. 3 is a diagram illustrating the use of a gateway to couple users with a private network and the Internet in accordance with a presently preferred embodiment of the present invention. Computer 80 connects to gateway 82 through a modem 84, while computers 86a and 86b couple to a router 88, then through modem 90 to gateway 82. Gateway 82 may then interface computers 80, 86a, and 86b to an intranet or private network 92 and the Internet 94 or both simultaneously.

Figure 4:
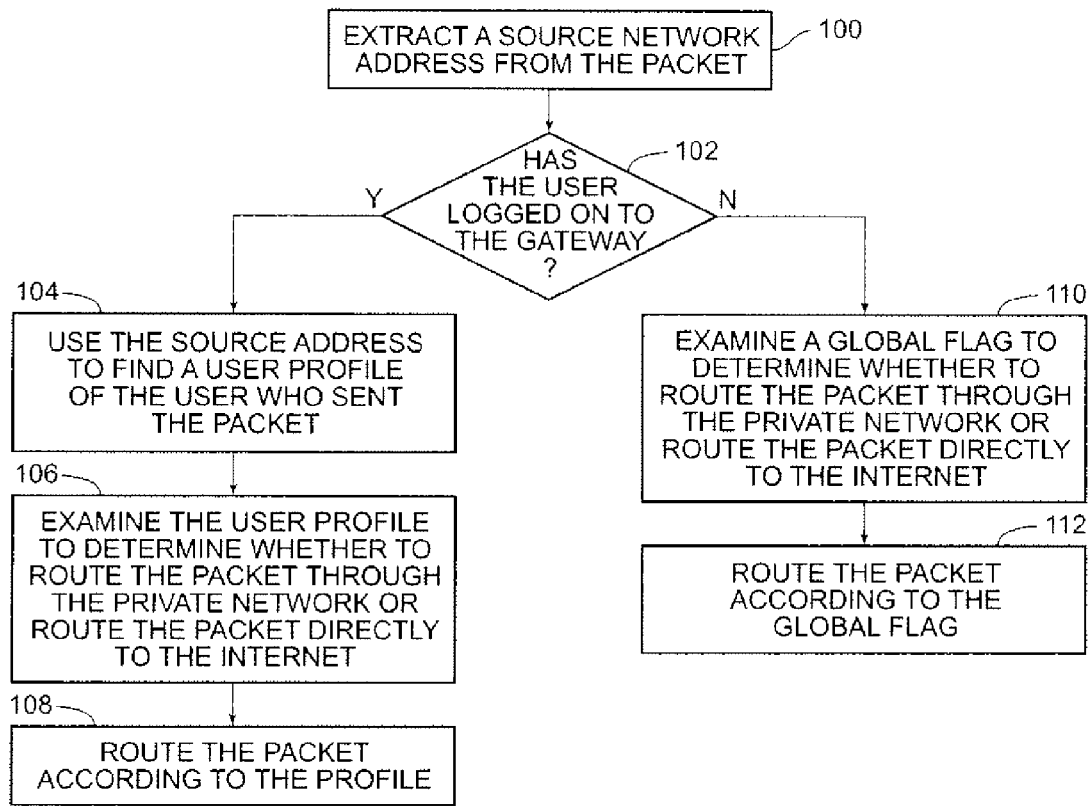
FIG. 4 is a flow diagram illustrating a method for routing a packet sent from a user to the Internet in accordance with a presently preferred embodiment of the present invention.
Figure 5:
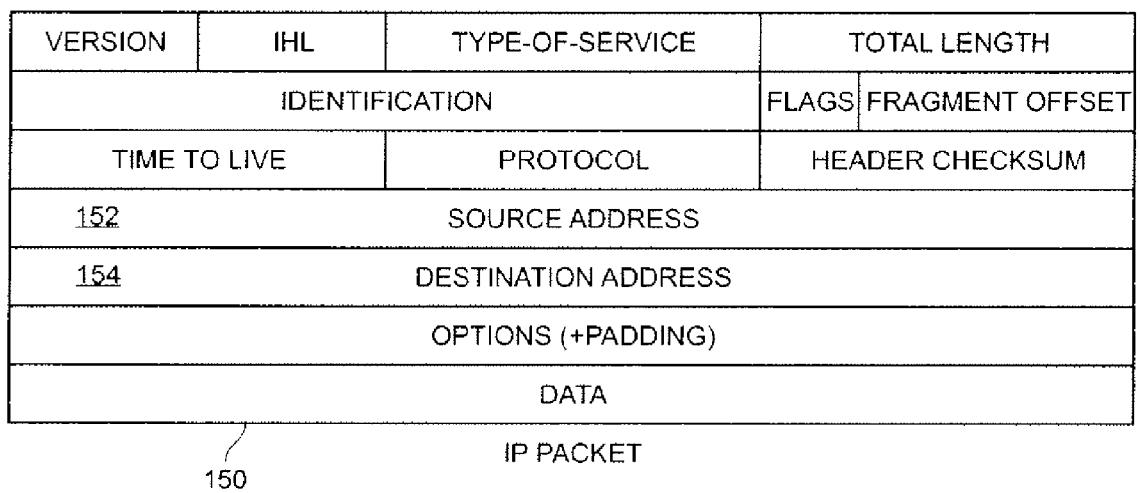
FIG. 5 is a diagram illustrating a packet in accordance with the IP protocol.

FIG. 4 is a flow diagram illustrating a method for routing a packet sent from a user to the Internet according to a presently preferred embodiment of the present invention. This method may be executed by a gateway. The user is connected to the gateway and the gateway is connected to a private network. The gateway may be coupled to the Internet, but does not have to be in order for this method to be performed. If, however, the method determines that the packet should be routed directly to the Internet, a direct Internet connection will have to be established if one does not already exist. At 100, a source address is extracted from the packet. The source address is a unique address which may be used to identify the user who sent the packet. FIG. 5 is a diagram illustrating an IP packet in accordance with a presently preferred embodiment of the present invention. IP packet 150 contains a source address field 153 and a destination address field 154. The source network address may be extracted from the source address field 152. The present invention, however, is not limited to use with IP packets and those of ordinary skill in the art will recognize that different types of packets or transmission data structures may be utilized.

At 102, the gateway determines if the user has logged on to the gateway yet. This may be determined in many ways, including searching through a list of logged on users and seeing if any of their source addresses match the source address from the packet.

If the user has logged on to the gateway, the process moves to 104, where the source address is used to find a user profile of the user who sent the packet. The user profile may contain various pieces of information regarding the user's account, including information as to whether any network traffic sent from the user to the Internet should be routed through the Internet.

Figures 6, 7:
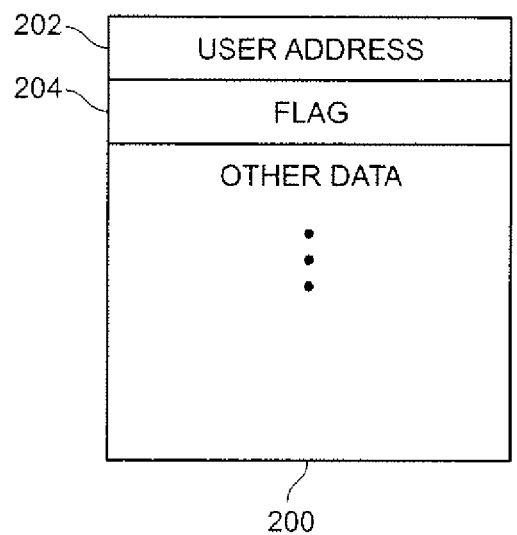
FIG. 6 is a diagram illustrating a user profile corresponding to a single user in accordance with a presently preferred embodiment of the present invention.
FIG. 7 is a diagram illustrating a user profile corresponding to a group of users in accordance with a presently preferred embodiment of the present invention.

The user profile may take on many forms. It may be stored within the gateway. It may be downloaded from an authentication server or other external device. The user profile may correspond to a single user or to a group of users. FIG. 6 is a diagram illustrating a user profile corresponding to a single user in accordance with a presently preferred embodiment of the present invention. The user profile 200 is identified by a user source address 202 and may contain a flag 204 indicating whether traffic sent to the Internet should be directly forwarded to the Internet for the corresponding user. FIG. 7 is a diagram illustrating a user profile corresponding to a group of users in accordance with a presently preferred embodiment of the present invention. This type of user profile may be used to store information on every user who subscribes to an ISP or any other grouping of users. User profile 250 contains a user source address 252 for each user in the group, along with a corresponding flag 254 for each user in the group indicating whether traffic sent to the Internet from each user should be directly forwarded to the Internet.

Both types of user profiles may also contain additional pieces of information about the user. The descriptions of the user profiles above are not meant to be limiting and the exact structure of the profiles may be modified in many different ways.

Referring back to FIG. 4, at 106 the gateway examines the user profile to determine whether to route the packet through the private network or to route the packet directly to the Internet. The precise method by which the gateway performs this task depends on the implementation of the user profile. For the user profile depicted in FIG. 6, this may involve searching through multiple user profiles until one that has a user address 202 matching the user network address is found. For the user profile in FIG. 7, this may involve retrieving the user profile corresponding to the group that the user belongs, and then searching the user addresses 252 in the user profile 250 until one that matches the user network address is found. In both cases, the corresponding flag may be checked in order to determine whether to route the packet through the private network or to route the packet directly to the Internet.

Referring back to FIG. 4, at 108, the gateway then routes said packet according to the user profile.

One additional aspect that should be addressed is how to deal with packets sent from a user who, while connected to the gateway, has not logged on to the gateway yet. A user who has logged on to the gateway may have a user profile. However, if a user has not logged on to the gateway, he cannot have a user profile. There is currently no way to link a user profile with an unknown user, since user profiles are, by definition, associated with particular users (most commonly by utilizing the user's IP address). In order to remedy this situation, the gateway may contain a global flag, indicating whether packets sent from users to the Internet should be routed directly to the Internet or through a private network when those users have not logged in to the gateway. Thus, at 110, the global flag is examined to determine whether to route the packet through the private network or route the packet directly through to the Internet if the user has not logged on to the gateway. At 112, the packet is routed according to the global flag if the user has not logged on to the gateway.

Figure 8:
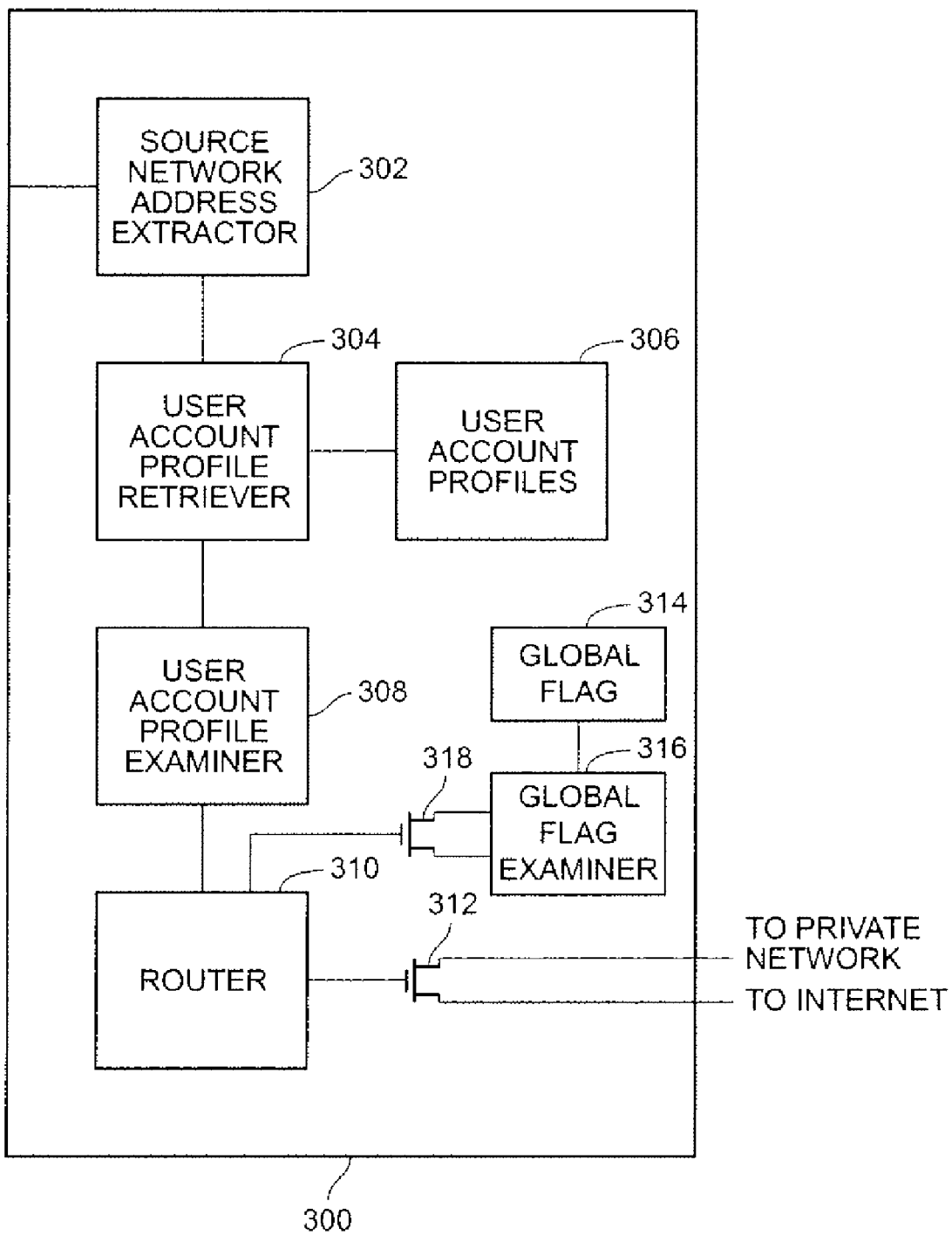
FIG. 8 is a block diagram illustrating a gateway for routing a packet in accordance with a presently preferred embodiment of the present invention.

FIG. 8 is a block diagram illustrating a gateway for routing a packet in accordance with a presently preferred embodiment of the present invention. Gateway 300 includes a source network address extractor 302, which extracts a source network address from the packet. Referring to FIG. 5, the source network may be extracted from the source address field 202 of IP packet 200. A user profile retriever 304 is coupled to the source network address extractor 302 and also coupled to one or more user profiles 306. The user profile retriever uses the source address extracted by the source network address extractor 302 to find a user profile corresponding to the user who sent the packet. As described above, the user profile may take many different forms, and the precise process by which the source network address extractor 302 finds the user profile is tied to the structure and organization of the user profiles.

A user profile examiner 308 is coupled to the user profile examiner 306. The user profile examiner examines the user profile found by the user profile retriever 304 to determine whether to route the packet through the private network or route the packet directly to the Internet. Again, the user profile may contain a flag which indicates the answer. A router 310 is coupled to the user profile examiner and is coupled to either a private network or to the Internet by way of a switch 312, the switch controlled by what determination was made by the user profile examiner 308.

A global flag 314 may indicate how to route the packet if the user has not logged on to the gateway. Therefore, a global flag examiner 316 is coupled to the global flag and examines the flag to determine the default setting if the user has not logged on to the gateway. Router 310 is coupled to the global flag examiner 316 via a switch 318 if the user has not logged on to the gateway. The router then uses this information (rather than information taken from a user profile) in routing the packet.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method comprising:
   determining whether a device has logged on to a gateway having connections to a private network and to an Internet, wherein a user profile is associated with the device; and
   routing a packet according to a global flag, the global flag indicating whether to route the packet to the Internet directly or through the private network, the packet sent from the device to the Internet.

2. The method of claim 1, wherein the user profile corresponds to multiple users in a group.

3. The method of claim 1, wherein the user profile is retrieved from an authentication server.

4. A program storage device readable by a computer, tangibly embodying a program of instructions executable by the computer to perform a method, the method comprising:
   determining whether a device has logged on to a gateway having connections to a private network and to an Internet, wherein a user profile is associated with the device; and
   routing a packet according to a global flag, the global flag indicating whether to route the packet to the Internet directly or through the private network, the packet sent from the device to the Internet.

5. The program storage device of claim 4, wherein the user profile corresponds to multiple users in a group.

6. The program storage device of claim 4, wherein the user profile is retrieved from an authentication server.

7. An apparatus comprising:
   means for determining whether a device has logged on to a gateway having connections to a private network and to an Internet, wherein a user profile is associated with the device; and
   means for routing a packet according to a global flag the global flag indicating whether to route the packet to the Internet directly or through the private network, the packet sent from the device to the Internet.

8. The apparatus of claim 7, wherein the user profile corresponds to multiple users in a group.

9. The apparatus of claim 7, wherein the user profile is retrieved from an authentication server.

10. An apparatus for routing a packet sent from a device to the Internet, the device connected to a private network, including:
    a global flag examiner configured to examine a global flag to determine whether to route the packet through the private network or to route the packet directly to the Internet if the device has not logged on to a gateway device having connections to the private network and to the Internet, wherein a user profile is associated with the device, and the packet is routed according to the global flag if the device has not logged on to the gateway device.

11. The apparatus of claim 10, wherein the user profile corresponds to multiple users in a group.

12. The apparatus of claim 10, wherein the user profile is retrieved from an authentication server.

13. A network device apparatus for routing comprising:
    an input interface;
    an output interface;
    a processor which executes instructions that cause the processor to:
       determining whether a device has logged on to a gateway having connections to a private network and to an Internet, wherein a user profile is associated with the device; and
       routing a packet according to a global flag, the global flag indicating whether to route the packet to the Internet directly or through the private network, the packet sent from the device to the Internet.

14. The apparatus of claim 13, wherein the user profile corresponds to multiple users in a group.

15. The apparatus of claim 13, wherein the user profile is retrieved from an authentication server.

* * * * *